United States Patent [19]

Kamaike

[11] Patent Number: 4,640,389
[45] Date of Patent: Feb. 3, 1987

[54] SYSTEM FOR CONTROLLING A MOTOR
[75] Inventor: Hiroshi Kamaike, Inazawa, Japan
[73] Assignee: Mitsubishi Denki Kabushiki Kaisha, JPX
[21] Appl. No.: 685,119
[22] Filed: Dec. 21, 1984
[30] Foreign Application Priority Data Dec. 26, 1983 [JP] Japan ............................ 58-250289

[51] Int. Cl.$^4$ .............................................. B66B 1/30
[52] U.S. Cl. .................................... 187/119; 318/807
[58] Field of Search .................. 187/29; 318/807, 808

[56] References Cited

U.S. PATENT DOCUMENTS

| 3,866,097 | 2/1975 | Anzai et al. | 318/212 |
| 4,402,387 | 9/1983 | Tsuji et al. | 187/29 R |
| 4,503,937 | 3/1985 | Cervenec et al. | 187/29 R |
| 4,545,464 | 10/1985 | Nomura | 187/29 R |

FOREIGN PATENT DOCUMENTS

| 2105128 | 3/1983 | United Kingdom . | |
| 2106342 | 4/1983 | United Kingdom | 187/29 R |
| 2121557 | 12/1983 | United Kingdom . | |
| 2139832 | 11/1984 | United Kingdom . | |

OTHER PUBLICATIONS

"Theory and Characteristics of a New Induction Motor Drive System Having Linear Transfer Function", IPEC Conference Record, pp. 462–473, H. Sugimoto et al, Mar. 27–31, 1983.

Primary Examiner—William M. Shoop, Jr.
Assistant Examiner—W. E. Duncanson, Jr.
Attorney, Agent, or Firm—Leydig, Voit & Meyer, Ltd.

[57] ABSTRACT

An alternating current having a variable voltage and frequency which is converted by an inverter is supplied to an induction motor for driving an elevator so that a speed command value is decreased and the output frequency of the inverter is decreased at the energy saved operation. Thus, energy saved operation may be accomplished without adversing the efficiency even if the speed of the cage is decreased. Since the output voltage of the convertor is increased simultaneously with this, the power factor is improved so that saving in energy is furthermore enhanced.

19 Claims, 31 Drawing Figures

SYSTEM FOR CONTROLLING A MOTOR

BACKGROUND OF THE INVENTION

The present invention relates to a system for controlling a motor and more particularly to improvements in a system for controlling the speed of an elevator which is driven by an AC motor.

An apparatus in which a high speed elevator is operated by using an induction motor to drive a cage and controlling the applied voltage to the motor to provide smooth operation characteristics is disclosed, for example, in U.S. Pat. No. 3,866,097. The outline of the apparatus will be described with reference to FIG. 1.

In the drawing, reference symbols R-S-T represents a three-phase AC power source, numeral 1 a three-phase induction motor having primary windings 1A to 1C connected to each phase of the AC power source R-S-T, numerals 2A to 2C thyristors, numerals 3A to 3C diodes which are connected in parallel with the thyristors 2A to 2C, respectively, and are connected between the AC power source phases R-S-T and the primary windings 1A to 1C of the motor 1, numeral 3 a center tapped transformer having a primary winding connected to the AC power source R-S-T and the secondary windings connected to an opposite end of the primary winding 1B of the motor 1 via thyristors 4A and 4B and having a center tap connected to the primary winding 1C, numeral 5 a speed detector or tacho generator which is coupled with a rotor shaft of the motor 1 for generating a speed signal 5a which is proportional to the rotational speed of the rotor, numeral 6 a drive pulley which is driven by the rotor of the motor 1, numeral 7 a main rope which is wound on the pulleys 6, numeral 8 and 9 a cage and a counter weight connected to the opposite ends of the main rope 7, numeral 10 a speed command generating circuit, numeral 11 an operational amplifier which amplifies the difference between the speed command signal 10a and the speed signal 5a and operates a trigger control circuit 12 or 13 in accordance with the difference. The trigger control circuits 12 and 13 are adapted to trigger-control the thyristors 2A to 2C and 4A, 4B, respectively.

When the motor 1 is operated as is done when the cage 8 is decelerated during a descent mode of operation under a heavy load, the speed signal 5a becomes greater than the speed command value 10a. The operational amplifier 11 provides an output to the trigger control circuit 13 so that the thyristors 4A and 4B are trigger controlled. Accordingly, since the thyristors 4A and 4B provide a center tapped single phase full wave rectifying circuit, a direct current flows through the primary windings 1B, 1C of the motor 1 in a direction designated by an arrow X. The motor 1 provides a braking torque corresponding to that required by the load so that the cage 8 is smoothly decelerated.

On the other hand, demands for saving energy have recently increased. One of the provisions for realizing the saving of energy is to decrease the output of the motor by decreasing the speed of the cage 8 when a smaller number of passengers use the elevator. However in order to reduce the speed at a power running by means of a control as shown in FIG. 1, the voltage is lowered to increase the slip in the motor. In order to lower the speed at braking, only direct current should be increased. This makes the efficiency at a low speed operation very adverse. The input is reversely increased so that saving in energy is not accomplished even if the output of the motor 1 is decreased by lowering the speed.

SUMMARY OF THE INVENTION

It is an object of the present invention to provide a system which overcomes the afore-mentioned problems.

It is another object of the present invention to provide a system for controlling the speed of an AC elevator in which an alternating current having a variable voltage and variable frequency which is converted by an inverter is applied to an induction motor and the speed command value is lowered at an energy saving running command and the output frequency of the inverter is lowered so that the speed of the cage is decreased to make it possible to carry out an energy saving operation.

An embodiment in which the present invention is applied to the vector control of an induction motor will be described herebelow with reference to FIGS. 2 to 31.

Figure 1:
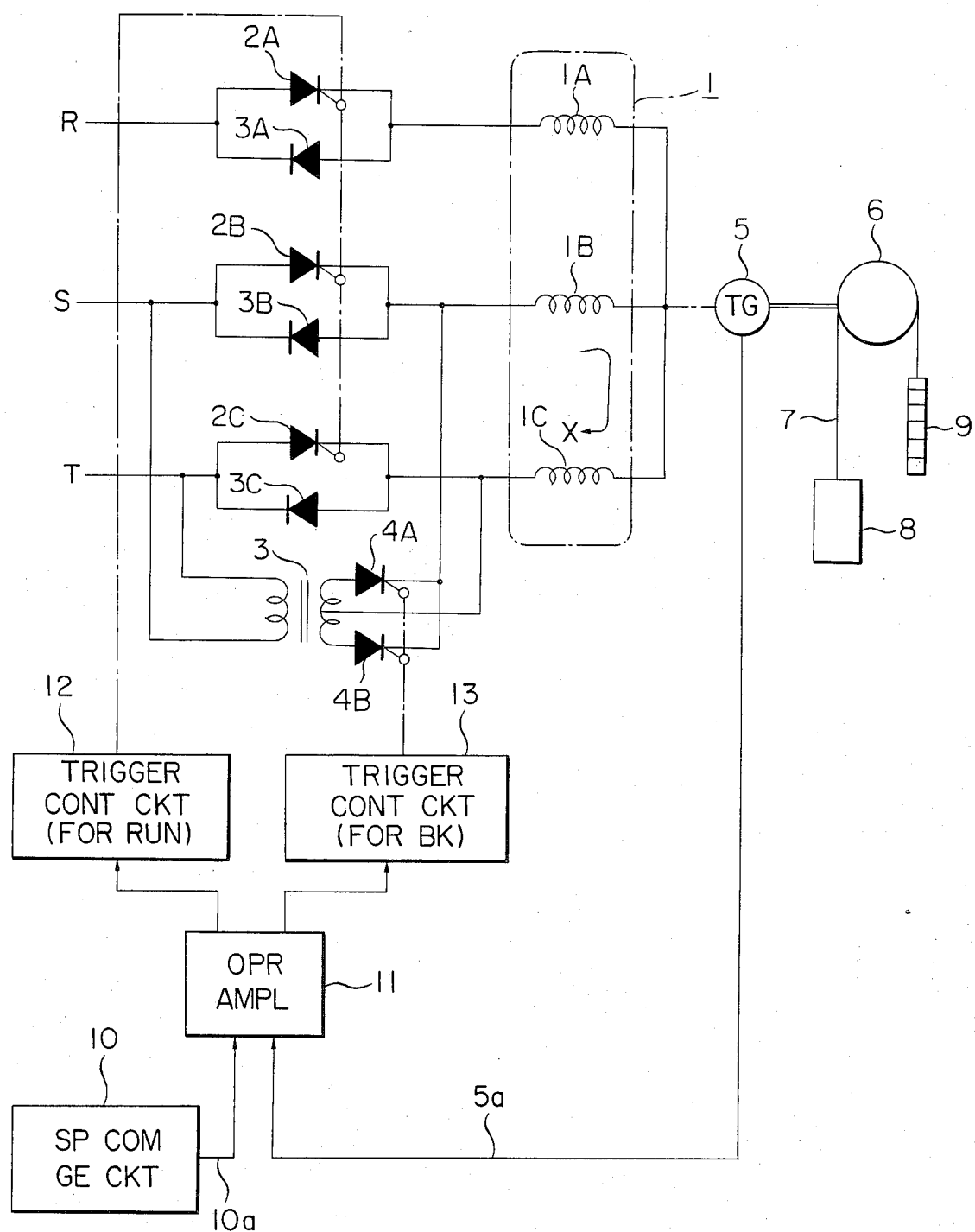
FIG. 1 is a diagram showing the arrangement of a conventional speed control system for an AC elevator.
Figure 2:
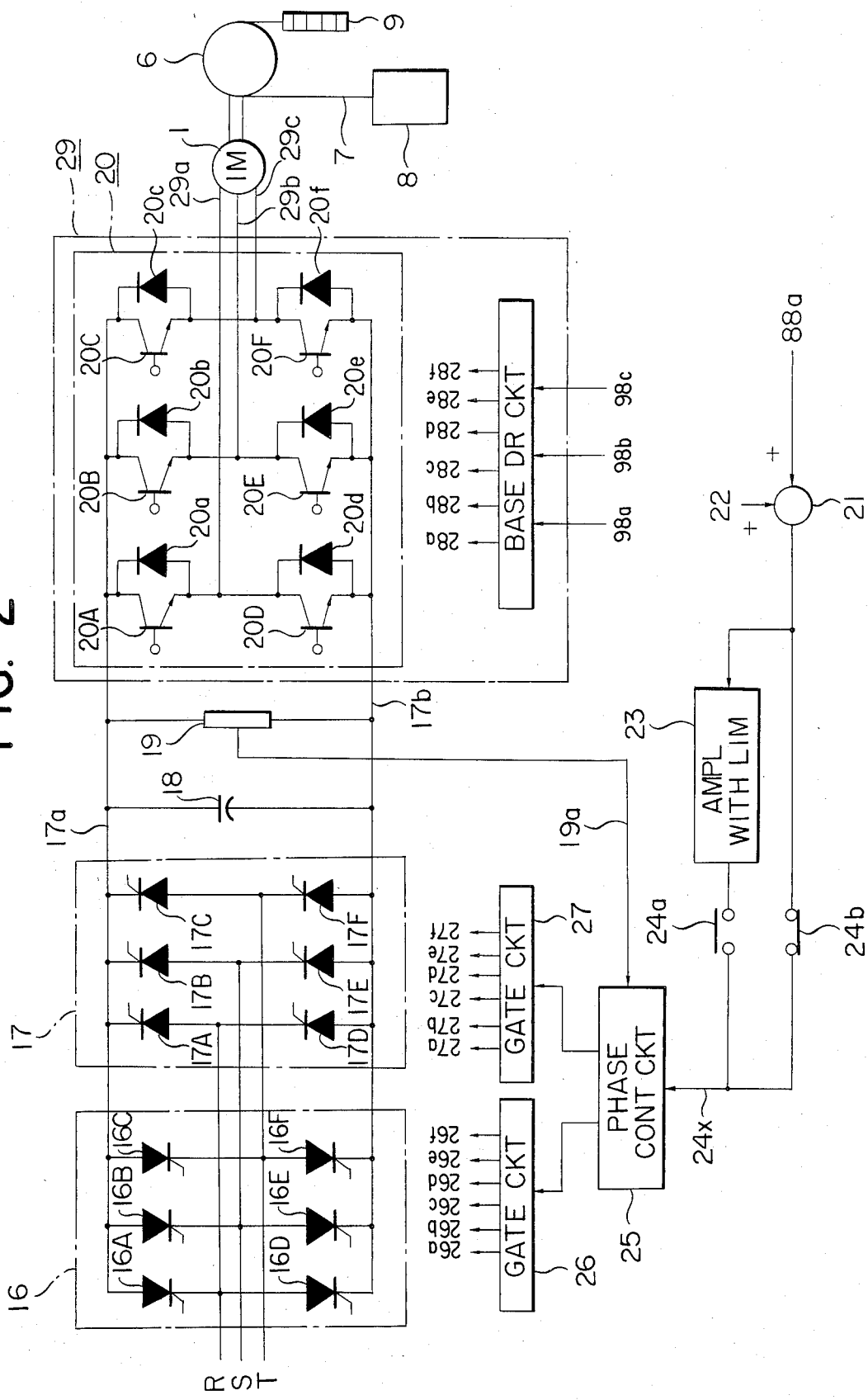
FIG. 2 is circuit diagram showing an embodiment of the speed control system for an AC elevator of the present invention.

Referring now to FIG. 2, there is shown a regenerative braking converter 16 which is connected to an alternating power source R-S-T and includes thyristors 16A to 16F to provide a full wave rectifying circuit. A power running converter 17 is connected to the alternative power source R-S-T and the DC side of the regenerative braking convertor 16 and includes thyristors 17A to 17F to provide a three-phase full wave rectifying circuit. A smoothing capacitor 18 is connected to direct current outputs 17a and 17b of the power running convertor 17. A voltage detector 19 including a resistor which is connected across the smoothing capacitor 18. The detector 19 has an output 19a connected to a phase control circuit 25. An invertor 20 is connected to the direct current outputs 17a and 17b and includes six transistors 20A to 20F and six diodes 20a to 20f. The diodes 20a-20f are connected across the transistors 20A-20F. The transistors 20A-20F are connected in series pairs across the direct current outputs 17a and 17b. An adder 21 (refer to FIG. 22) is adapted to add a constant value signal 22 with a synchronization angular velocity signal 88a which will be described herebelow. An amplifier 23 (FIG. 22) with a limiter is adapted to amplify the output of the adder 21 and saturates at a given value. A relay contact 24a for commanding an energy saving running is connected in series with the amplifier 23 and is closed when the energy saving running is commanded. A relay contact 24b for commanding a low energy running is connected in series with the adder 21 and is opened when the energy saving running is commanded. Reference numeral 24x represents a voltage command signal which is outputed from the contacts 24a and 24b. The phase control circuit 25 (FIGS. 3 to 5) is adapted to open a gate circuit 26 (FIG. 7) and a gate circuit 27 (FIG. 6) depending on the relation between the amplitudes of the voltage command signal 24x and the output of the voltage detector 19a. Timing signals 26a to 26f from the gate circuit 26 are applied to the gates of the thyristors 16A to 16F and timing signals 27a to 27f from the gate circuit 27 are apppplied to the gates of the thyristors 17A to 17F. A base driving circuit 28 (FIG. 8) receives primary voltage command values 98a to 98c and provides base driving signals 28a to 28f to the bases of the transistors 20A to 20F, respectively. A pulse width modulating inverter 29 having outputs 29a to 29c includes the invertor 20 and the base driving circuit 28.

Figure 3:
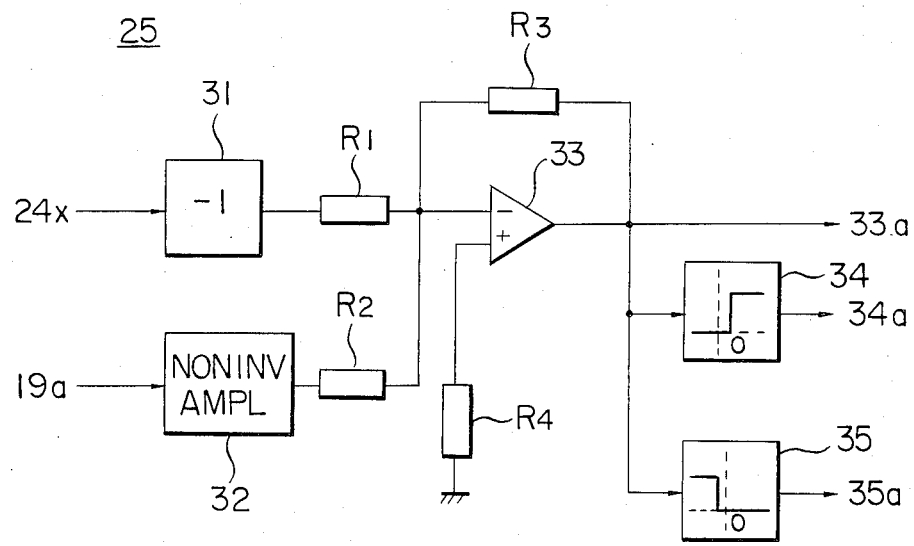
FIGS. 3 to 5 are circuit diagrams showing an phase control circuit of FIG. 2.
Figure 4:
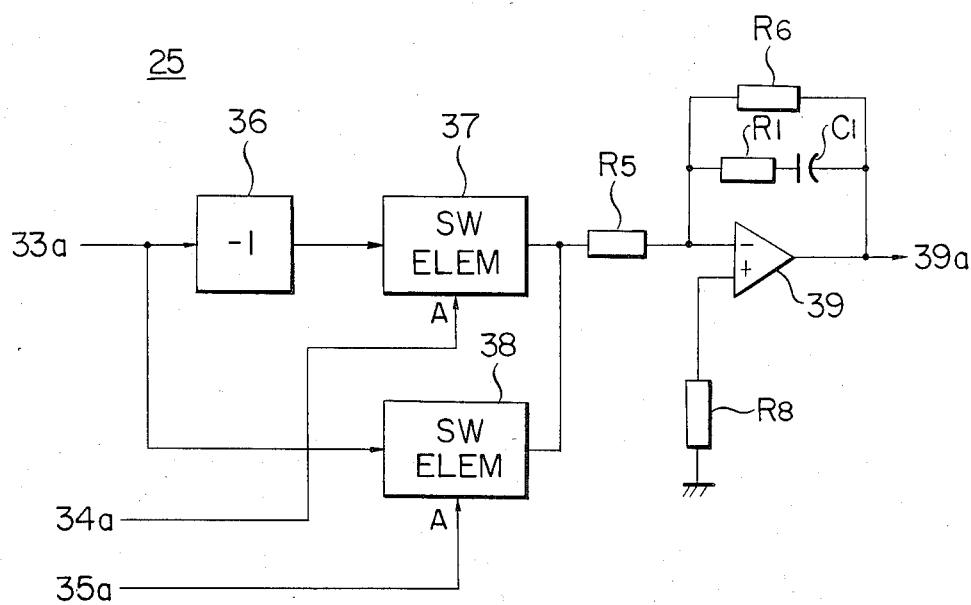
Figure 5:
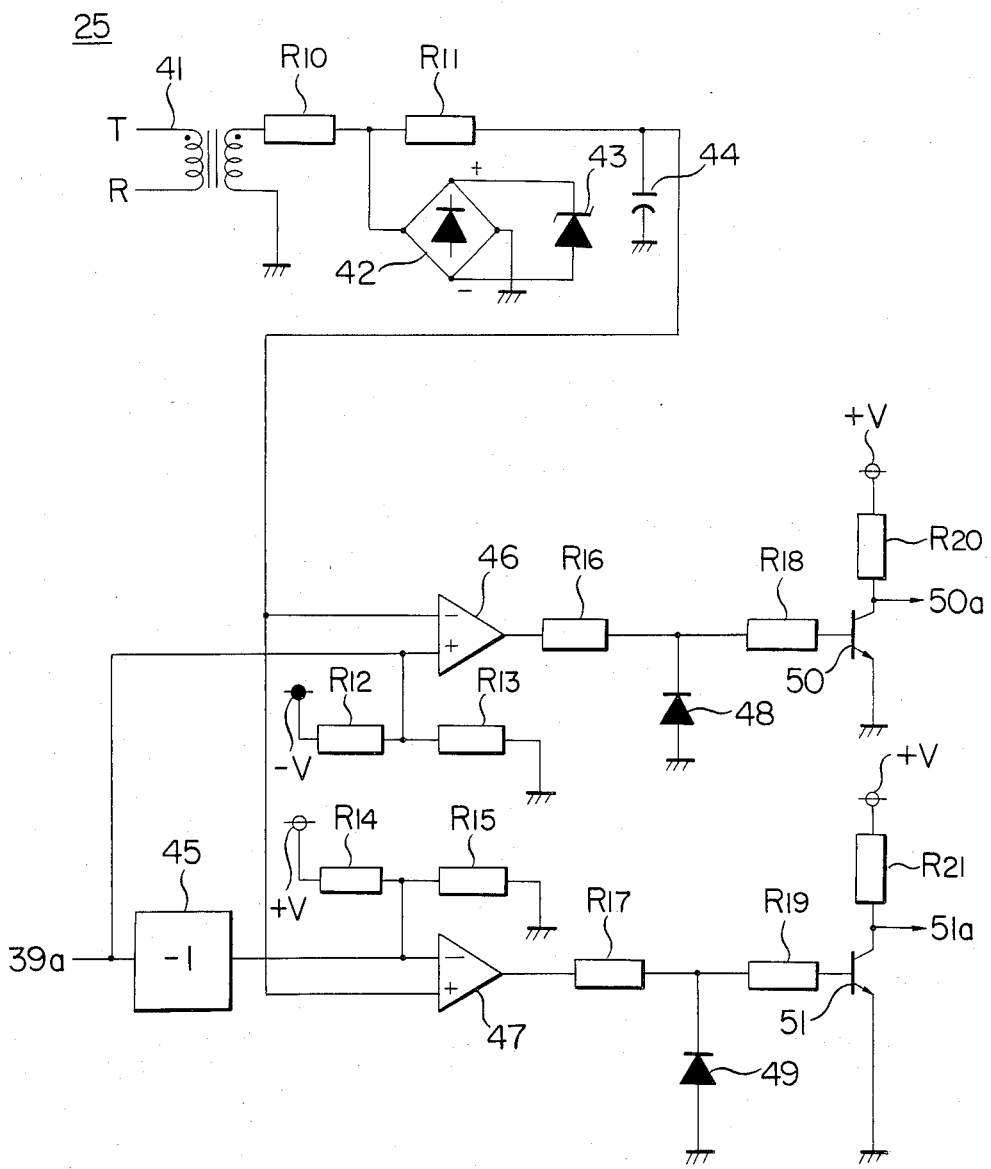

FIGS. 3 to 5 shows the arrangement of the phase control circuit 25. In FIG. 3, reference numerals 31, 32 and 33 represent an inverting amplifier (FIG. 20) having a gain of −1, non-inverting normal amplifier (FIG. 21) and an operational amplifier having an output 33a, respectively. A comparator 34 (FIG. 27) provides a "H" output 34a when the input reaches a predetermined positive value. A comparator 35 (FIG. 28) provides a "H" output 35a when the input reaches a predetermined minus value. Reference numerals $R_1$ to $R_4$ represent resistors.

When the output of the voltage detector 19a is lower than the synchronization angular velocity signal 24x, that is, the potential of the smoothing capacitor 18 is lower than the voltage command value, the added value is minus. However the added value is inverted by the operational amplifier 33 to provide a positive output 33a. Accordingly the output 34a of the comparator 34 is "H" and the output 35a of the comparator 35 is "L". In the contrary case, that is, when the potential of the smoothing capacitor 18 is higher than the voltage command value, the added value is rendered positive while the output 33a of the operational amplifier 33 is rendered negative. Accordingly the output 34a of the comparator 34 is "L" and the output 35a of the comparator 35 is "H". The outputs 34a and 35a are used to enable either one of the power running convertor 17 and the regenerative convertor 16.

Referring now to FIG. 4, reference numerals 36, 37, 38 and 39 represent an inverting amplifier (FIG. 20) having a gain of −1, switch elements (for example HA201 manufactured by HARRIS Co., Ltd.) which are rendered conductive when the input A is "H" and an operational amplifier having an output 39a. Reference numerals $R_5$ to $R_8$ represent resistors and $C_1$ a capacitor.

When the signal 34a is "H", the signal 33a is inverted and passed through a switching element 37. When the signal 35a is "H" the signal 33a is directly passed through the switching element 38. Compensation for the gain and phase of these signals is carried out by the operational amplifier 39, resistors $R_5$ to $R_8$ and the capacitor $C_1$.

Referring now to FIG. 5, reference numerals 41, 42, 43 and 44 represent a transformer, a rectifying circuit connected to a secondary winding of the transformer 41, a Zener diode connected across the DC outputs of the rectifying circuit 42 and a capacitor, respectively. Reference numeral 45 designates an inverting amplifier (FIG. 20) having a gain of −1, numerals 46 and 47 operational amplifiers, numerals 48 and 49 diodes for limiting the negative voltage, numerals 50 and 51 transistors having collector outputs 50a and 51a respectively, numerals $R_{10}$ to $R_{21}$ resistors, +V a semiconductor positive power source, and −V a negative power source. The phase control circuit 25 of FIG. 2 is provided with three circuits shown in FIG. 5 for R to T phases respectively.

A circuit comprising the transformer 41, rectifying circuit 42, Zener diode 43, capacitor 44 and resistors $R_{10}$ and $R_{11}$ generates a power source synchronization voltage for controlling the firing angle of the thyristors 16A to 16F, 17A to 17F of FIG. 2. For example, by applying a line voltage of R and T phases on the transformer 41, a synchronization voltage for controlling the firing angle of the R phase thyristors 16A, 16D, 17A and 17D may be obtained. A substantially triangular voltage is generated by the rectifying circuit 42, Zener diode 43 and the capacitor 44, and is fed to the operational amplifiers 46 and 47 as a reference value. Since the voltages which are biased by a circuit including the operational amplifier 46, resistors $R_{12}$ and $R_{13}$ and a negative power source −V and a circuit including the operational amplifier 47, resistors $R_{14}$ and $R_{15}$ and the positive power source +V are applied to the operational amplifiers 46 and 47, comparators having respective hysteresis are formed. Accordingly, when the positive signal 39a exceeds a predetermined value of the abovementioned triangular voltage, the output of the operational amplifier 46 is rendered "H". While the output of this operational amplifier 47 is "L". On the contrary, when the negative signal 39a exceeds a predetermined value of the triangular voltage, the output of the operational amplifier 47 is "H", while the output of the operational amplifier 46 is "L". When the output of the operational amplifier 46 is rendered "H" the transistor 50 is rendered conductive and the output 50a is rendered zero volts. On the other hand, since the transistor 51 is not conductive, the output 51a is positive.

Figure 6:
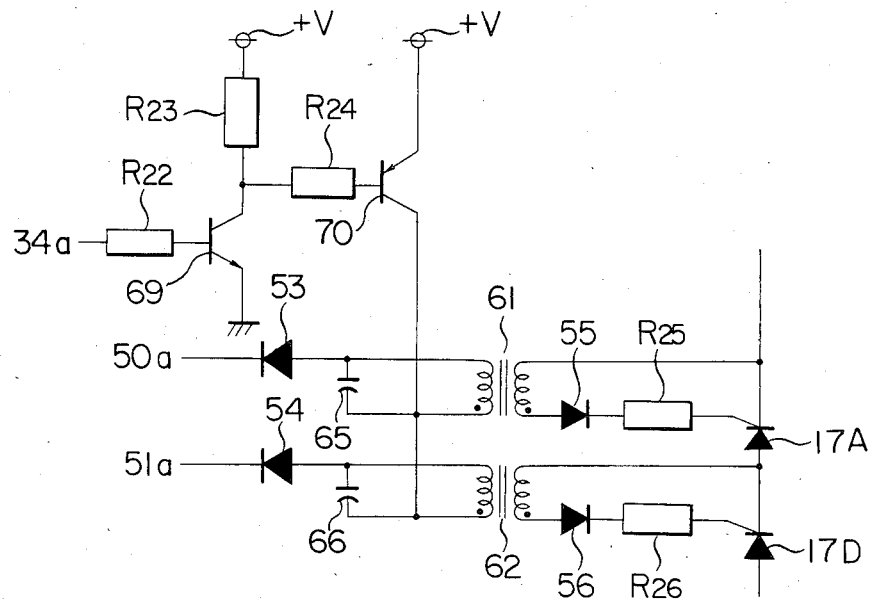
FIG. 6 is a circuit diagram showing a gate circuit of FIG. 2.
Figure 7:
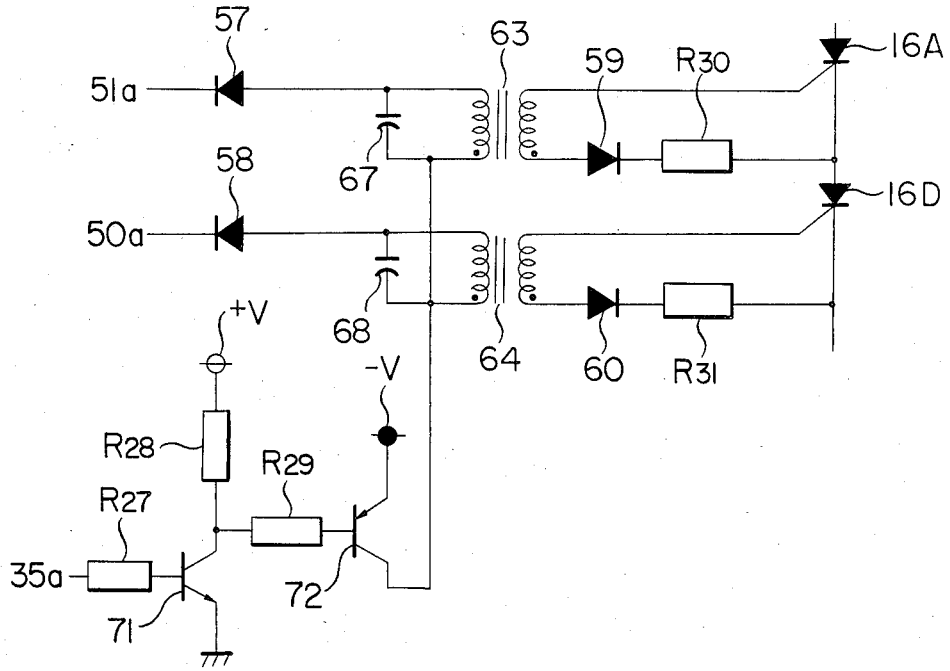
FIG. 7 is a circuit diagram showing a gate circuit of FIG. 2.

Referring now to FIGS. 6 and 7, reference numerals 53 to 60 represent diodes, numerals 61 to 64 pulse transformers, numerals 65 to 68 capacitors, numerals 69 to 72 transistors, and numerals $R_{22}$ to $R_{31}$ resistors. The FIGS. 6 and 7 shows a circuit for the phase R. The circuits for the S and T phases are formed in a manner similar to that of the R phase.

When the signal 34a is "H", that is, the potential of the smoothing capacitor 18 is lower than the voltage command value (at the power running time), the transistors 69 and 70 are rendered conductive and a positive voltage is applied to one end of a primary winding of the pulse transformers 60 and 61. Since a current flows through the primary winding of the pulse transformer 61 and the diode 53 when the transistor output 50a becomes a zero voltage, a pulse voltage is generated in the secondary winding so that the thyristor 17A is rendered conductive. Since the transistor output 51a has a positive voltage at this time, an electric current does not flow through the primary winding of the pulse transformer 61 and a pulse voltage is not generated in the secondary winding so that the thyristor 17D is not turned conductive. In such a manner the power running convertor 17 functions to raise the potential of the smoothing capacitor 19. When the signal 35a is "H", the pulse transformer 63 or 64 is operative by the outputs 50a and 51a of the transistors so that the thyristor 16A or 16D is turned conductive. In such a manner, the power running convertor 16 is operated to lower the potential of the smoothing capacitor 18.

Figure 8:
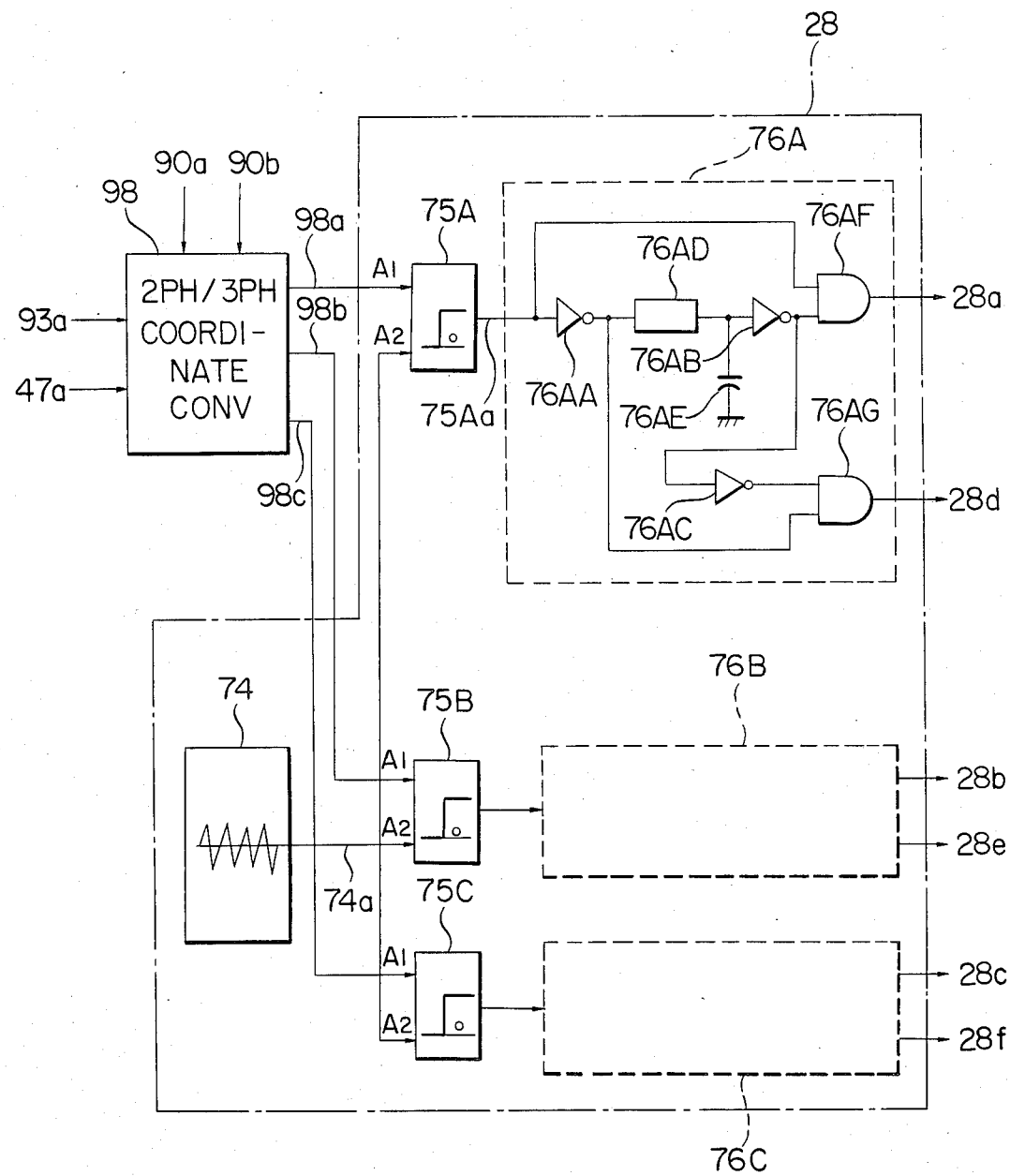
FIG. 8 is a block diagram showing a base drive circuit of FIG. 2.
Figure 9:
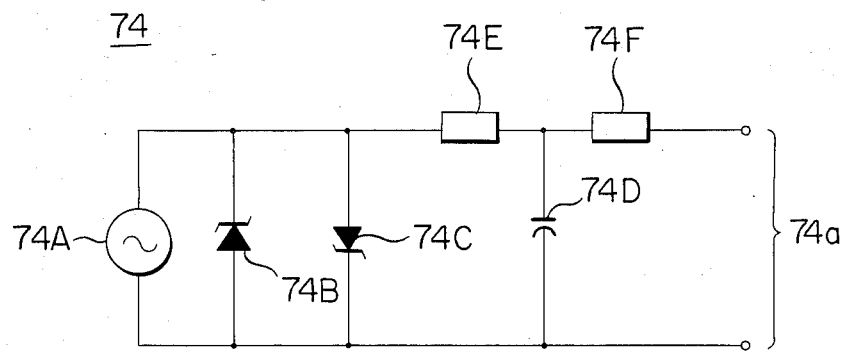
FIG. 9 is a circuit diagram showing a triangular wave generator of FIG. 8.
Figure 10:
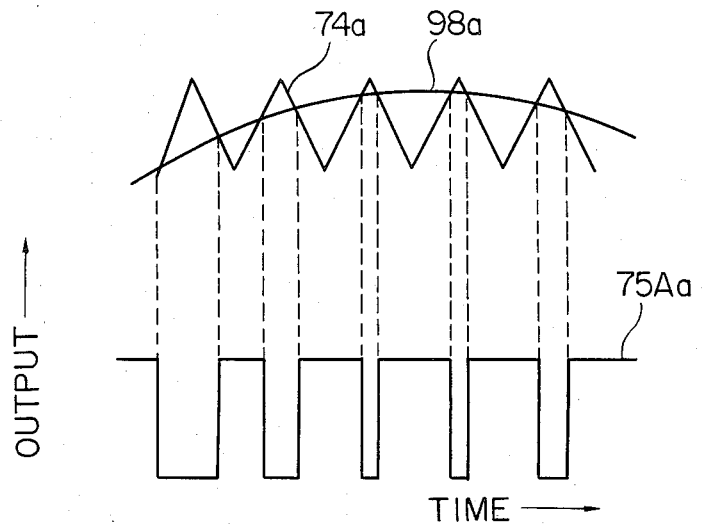
FIG. 10 is a view illustrating the operation of the generator of FIG. 8.

FIGS. 8 and 9 show the arrangement of the base driving circuit 28. In FIG. 8 reference numeral 74 represents a triangular wave generator (FIG. 9) which generates triangular waves having a given frequency sufficiently higher than that of the AC power source, numerals 75A to 75C designate comparators (FIG. 29) which compare an input $A_1$ with an input $A_2$ and generates an "H" output when the input $A_1 \geq$ the output $A_2$ and generates and "L" output when the input $A_1 <$ the output $A_2$, numerals 76A to 76C designate two-phase distributors, numerals 76AA to 76AC NOT gates, numeral 76AD a resistor, numeral 76AE a capacitor, numerals 76AF and 76AG AND gates. Since the comparator 75A compares the primary voltage command value 98a with the triangular wave 74a and generates an "H" signal, the former is equal to or greater than the later, the comparator 75A provides an output 75Aa having a wave form as shown in FIG. 10. The output 28a of the AND gate 76AF is "H" and the output 28d of the AND gate 76AG is "L" by the operation of the NOT gate 76AA to 76AC when the output 75Aa is "H". When the output 75Aa is "L", the output 28a of the AND gate 76AF is "L" and the output of the AND gate 76AG is "H", that is, the transistors 20A and 20d of the inverter 20 are alternatively turned on. The operation of the two-phase dividers 76B and 76c is similar to that of the inverter 20. The transistors 20B and 20F are alternatively turned on by the outputs 28b and 28e. The transistors 20C and 20F are alternatively turned on by the outputs 28C and 28F. In such a manner, a voltage which was a sinusoidal wave and which has been triangular-wave-modulated is applied to the electric motor 11.

In FIG. 9, reference numeral 74A represents an alternating current power source which generates a sinusoidal alternating current having a given frequency sufficiently higher than that of the alternating current power source R-S-T, numerals 74B and 74C designate Zener diodes, numeral 74D a capacitor, and numerals 74E and 74F resistors.

The maximum voltage of the sinusoidal alternating current of the AC power source 74A is restricted by the Zener diodes 74B and 74C. This alternating current is delayed by a delay circuit having a time constant including the capacitor 74D and the resistor 74E to provide a triangular wave 74a.

Figure 11:
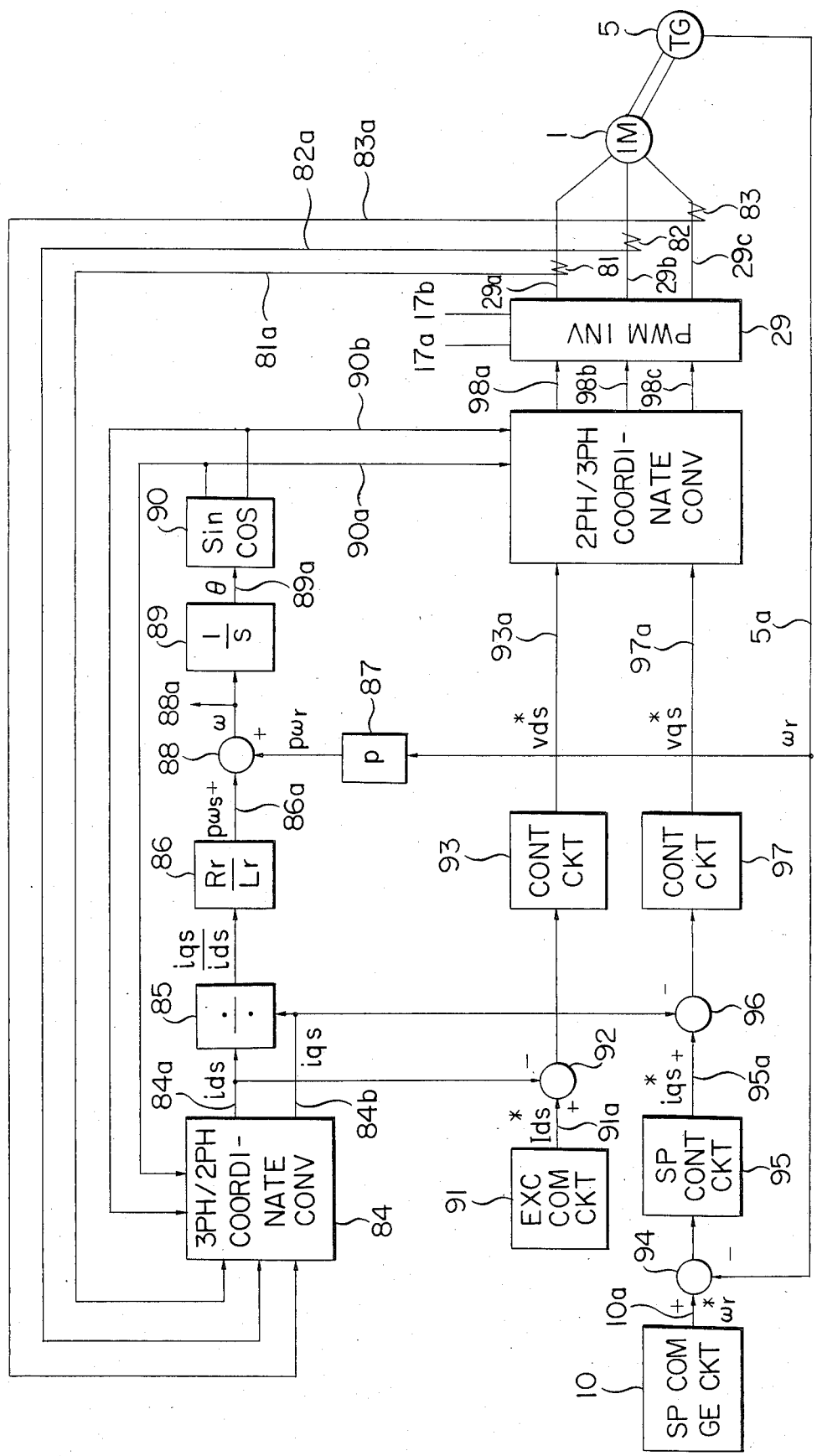
FIG. 11 is a block diagram showing a vector control system used in FIG. 2.

FIG. 11 shows the arrangement of the vector control system of the induction motor 1 in which a PWM inverter 29 is used to maintain constant excitation.

Direct current convertors 81 to 83 generate DC signals corresponding to the spontaneous values of the AC outputs of the PWM inverter 29. A three-phase to two-phase coordinate converter 84 (FIG. 15) into which a sinusoidal signal 90a and consinusoidal signal 90b described hereafter are fed is adapted to convert the DC signals 81a to 83a into a torque current component signal 84b and an excitation current component signal 84a on a rotating coordinate axis in synchronization of the angular velocity ω of the secondary magnetic flux vector of the motor 1. Reference numeral 85 represents a divider (for example, ANALOG DEVICES Inc., ADS3), numeral 86 a coefficient multiplying circuit (FIG. 17) which generates a slide frequency signal 86a by multiplying an input with a contant, numeral 87 an amplifier (FIG. 21) having a gain p(correspoding to the number of pole pairs of the motor 1), onto which a velocity signal 5a is applied. An adder 88 (FIG. 23) adds the slide frequency signal 86a with the output of the amplifier 87 to generate a synchronization angular velocity signal 88a. An integrator 89 (FIG. 25) integrates the synchronization angular velocity signal 88a to generate a phase angle signal 89a of ω secondary magnetic flux vector. A function generator 90 (FIG. 18) generates a sinusoidal wave 90a and a consinusoidal wave 90b by receiving a phase angle signal 89a. An excitation command circuit 91 (FIG. 19) generates an excitation current component command value 91a. A subtractor 92 (FIG. 24) subtracts the excitation current component signal 84a from the excitation current component command value 91a to generate its error signal. An excitation current component control circuit 93 includes a delay and advancement circuit shown in FIG. 26 and controls the subtractor 92 so that the subtractor 92 outputs a zero voltage. Reference numeral 93a represents an excitation voltage component command value, numeral 94 a subtractor (FIG. 24) which subtracts a velocity signal (5a) from a velocity command value 10a to generate its error signal, numeral 95 a velocity control circuit includes the delay and advancement circuit shown in FIG. 26 and carries out control so that the error signal becomes zero, numeral 95a a torque current component command value, numeral 96 a subtractor (FIG. 24) which subtracts the torque current component signal 84b from the torque current component command value 95a to generate its error signal, numeral 97 a torque current component control circuit including a delay and advancement circuit as shown in FIG. 6 which controls the subtractor 96 outputs zero, numeral 97a a torque voltage component command value, numeral 98 a two-phase to three-phase coordinate convertor (FIG. 16) which converts primary voltage command values 98a to 98c of each of three phases by inputting the excitation voltage component command value 98a, torque voltage component command value 97a, sinusoidal wave signal 90a and consinusoidal wave signal 90b.

Figure 12:
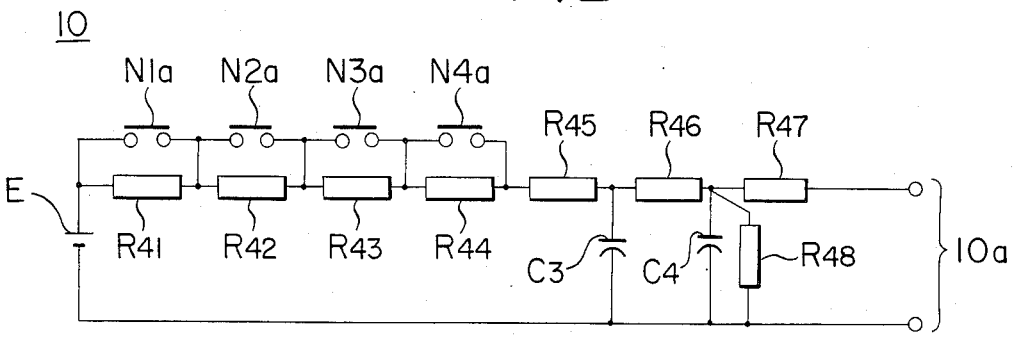
FIGS. 12 and 13 are circuit diagrams showing a speed command generating circuit of FIG. 11.
Figure 13:
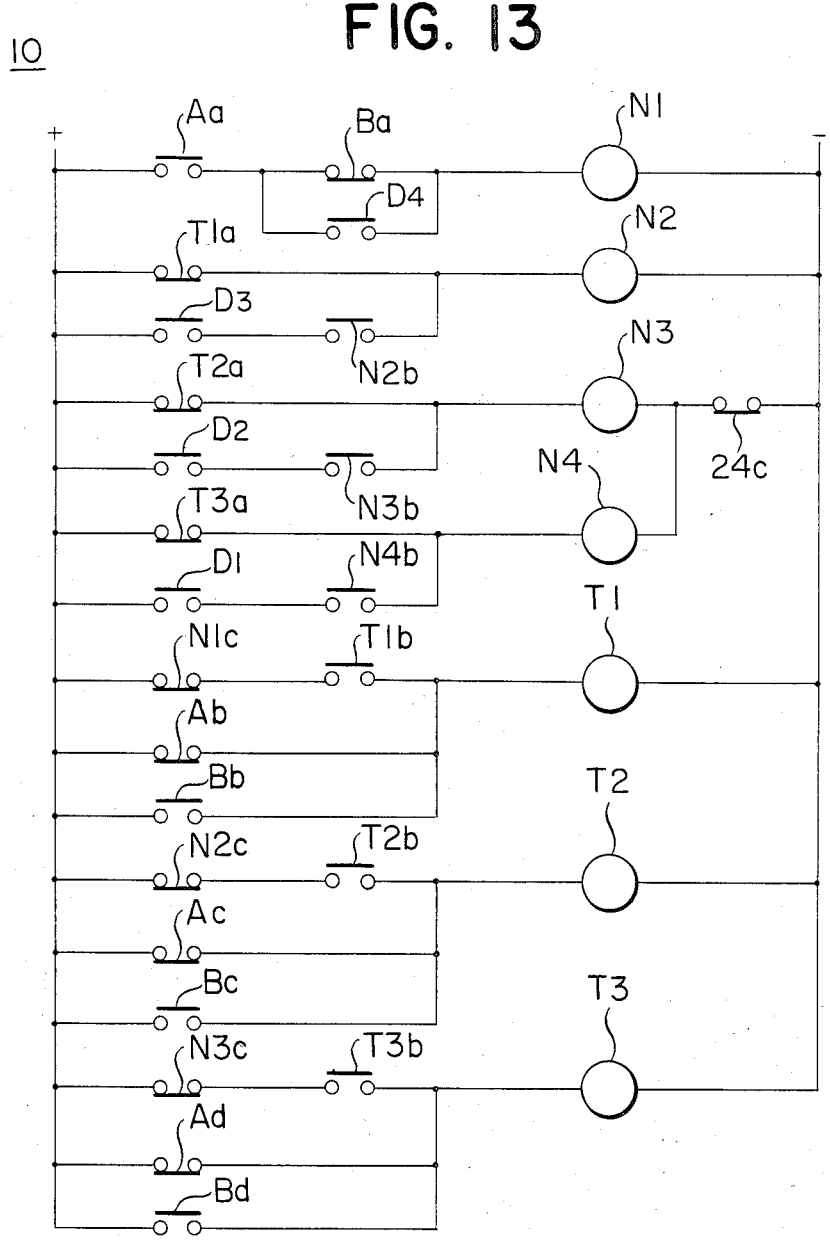

FIGS. 12 and 13 show an arrangement of the velocity command generating circuit 10. In the drawing, references E, (+) and (−) represents DC sources of numerals $R_{41}$ to $R_{48}$ resistors, $C_3$ and $C_4$ capacitors, Aa a starting command relay contacts which are closed when the starting command is outputed, Ab to Ad starting command relay contacts which are opened when the starting command is outputed, Ba stop determination relay contacts which are opened when stop is determined for a riding place call or a cage call, Bb to Bd stop determination relay contacts which are closed when stop is determined for a riding place call or a cage call, $D_1$ to $D_4$ deceleration point detection relay contacts which are closed when starting and serially opened in order of contacts $D_1$ to $D_4$ when a rear cage 8 reaches a given deceleration point. Reference numerals $N_1$ to $N_4$ represent acceleration and deceleration command relays, $N_{1a}$ to $N_{4a}$ normally open contacts of the acceleration and deceleration command relay, $N_{2b}$ to $N_{4b}$ normally open contacts of the acceleration and deceleration command relay $N_2$ to $N_4$, $N_{1c}$ to $N_{3c}$ normally closed contacts of the acceleration and deceleration command relays $N_1$ to $N_3$, $T_1$ to $T_3$ timing relays which are actuated on being energized and which return to their normal states after a period of time on being deenergized. Numerals $T_{1a}$ to $T_{3a}$ represent normally closed contacts of the timing relays $T_1$ to $T_3$, $T_{1b}$ to $T_{3b}$ normally closed contacts, numeral 24c energy saving running command relay contacts which are similar to the contacts 24b of FIG. 2.

When the power sources (+) and (−) are turned on, the timing relays $T_1$ to $T_3$ are energized through the starting command relay contacts Ab to Ad, and are self-held by the closing of the contacts T1b to T3b, respectively, and the contacts T1a to T3a are closed. The deceleration point detection relay contacts D1 to D4 are closed. The energy saving running command relay contacts 24c are normally closed.

Figure 14:
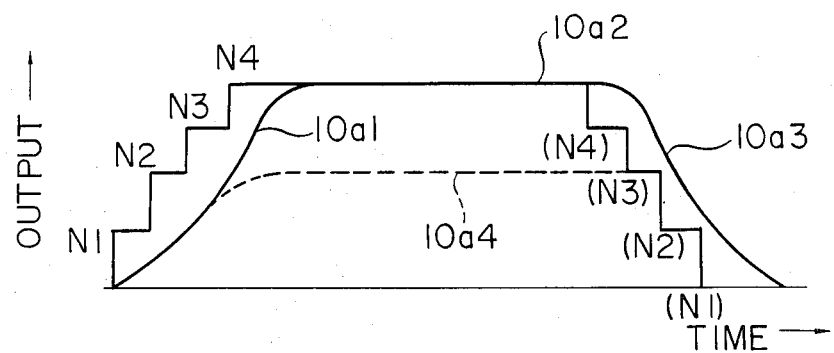
FIG. 14 is a view illustrating the operation of FIGS. 12 and 13.

When the starting command is outputted, the starting command relay contacts Aa are closed and the contacts Ab to Ad are opened. When the contacts Aa are closed, the acceleration and deceleration command relay N1 is energized and the contacts N1a is closed to short circuit the resistor R41 by the circuit (+)-Aa-Ba-N1-(−). By the circuit (+)-T1a-N2-(−), the acceleration and deceleration command relay N2 is energized and self-held by the closing of the contacts N2b. The contacts N2a are closed to short circuit the resistor R42. Since the contacts N2c are opened, the timing relay T2 is returned after a given period of time later. By the circuit (+)-T2a-N3-24c-(−) the acceleration and deceleration command relay N3 is energized and the contacts N3a are closed to short circuit the resistor R43. In a similar manner, the contacts N4a are closed to short circuit the resistor R44. The speed command value (10a) becomes an acceleration command value which gradually increases as shown in FIG. 14. When the acceleration mode is complete, the acceleration command value becomes a constant speed command state which is held at a contant value as represented by a curve 10a2.

When the call is detected and a stop mode is determined, the stop determination relay contacts Ba are opened and the contacts Bb to Bd are closed. By the closing of the contacts Bb to Bd, the timing relays T1 to T3 are energized to open the contacts T1a to T3a and to close the contacts T1b to T3b. When a given deceleration point is reached, the deceleration point detection relay contacts D1 are opened so that the acceleration and deceleration command relay N4 is deenergized to open the contacts N4a so that the resistor R44 is inserted. When the cage 8 reaches at next deceleration point, the deceleration point detection relay contact D2 are opened so that the acceleration and deceleration command relay N3 is deenergized to open the contacts N3a and the resisto R43 is inserted. Similarly, the contacts N2a and N1a are opened and the resistors R42 and R41 are serially inserted. In such a manner the speed command value 10a becomes a deceleration command value which gradually decreases as represented by a curve 10a3.

When the energy saving running command is provided, the contacts 24c are opened. Since this causes the acceleration and deceleration command relays N3 and N4 not to be energized, the speed command value 10a becomes a low speed value represented by a curve 10a4.

Figure 15:
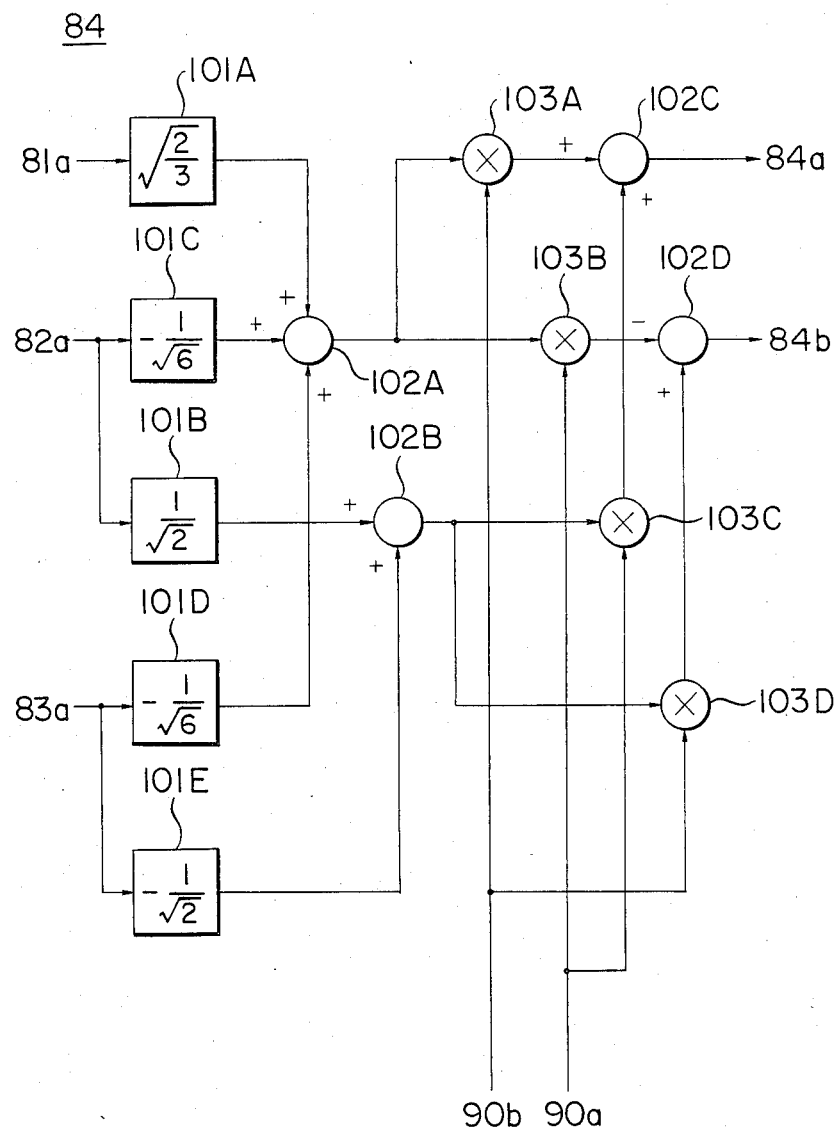
FIG. 15 is a block diagram showing a three-phase to two-phase coordinate convertor of FIG. 11.

FIG. 15 shows the arrangement of the three-phase to two-phase coordinate convertor 84. Amplifiers 101A and 101B (FIG. 21) have gains of $\sqrt{\frac{2}{3}}$ and $1/\sqrt{2}$ respectively. Inversion amplifiers 101C to 101E (FIG. 20) have gains of $-1/\sqrt{6}$, $-/\sqrt{6}$ and $-1/\sqrt{2}$, respectively. References 102A to 102C represent adders (FIG. 23), 102D a subtractor (FIG. 24), 103A to 103D multipliers (for example AD533 manufactured by ANALOG DEVICES Inc.).

The excitation current component signal 84a, the torque current component signal 84b and the DC current signals 81a to 83a of the motor 1 have the following relation as is well known:

$$\begin{bmatrix} ids \\ iqs \end{bmatrix} = \begin{bmatrix} \cos\theta, \sin\theta \\ -\sin\theta, \cos\theta \end{bmatrix} \begin{bmatrix} \sqrt{\frac{2}{3}}, -\frac{1}{\sqrt{6}}, -\frac{1}{\sqrt{6}} \\ 0, \frac{1}{\sqrt{2}}, -\frac{1}{\sqrt{2}} \end{bmatrix} \begin{bmatrix} iu \\ iv \\ iw \end{bmatrix}$$

where ids represents the excitation current component (84a). iqs represents the torque current components (84b) and iu to iw represent primary currents of motor 81a to 83a respectively. The coordinate convertor 84 calculates this formula.

Figure 16:
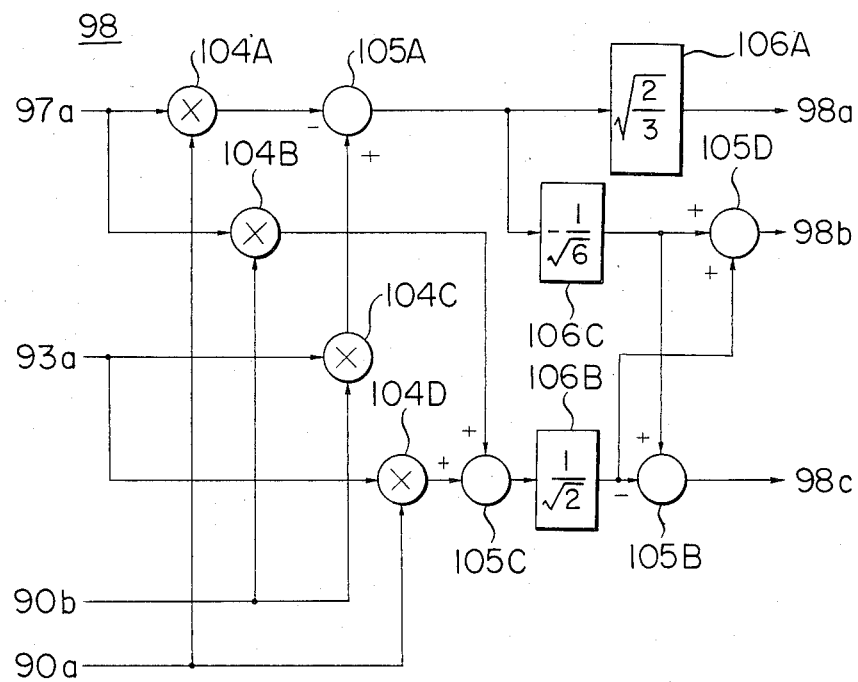
FIG. 16 is a block diagram showing the two-phase to three-phase convertor of FIG. 11.

FIG. 16 shows the arrangement of the two-phase to three-phase coordinate convertor 98. In the drawing, reference numerals 104A to 104D represent multipliers which are similar to the multiplier 103A, numerals 105A and 105B subtractors (FIG. 24), numerals 105C and 105D adders (FIG. 23), numerals 106A and 106B amplifiers (FIG. 21) having gains of $\sqrt{\frac{2}{3}}$ and $1/\sqrt{2}$ respectively, and numerals 106C an invert amplifier (FIG. 20) having a gain of $-1/\sqrt{6}$.

There is a well known following relation between the excitation and torque voltage command values and the primary voltage command values 98a to 98c.

$$\begin{bmatrix} Vu^* \\ Vv^* \\ Vw^* \end{bmatrix} = \begin{bmatrix} \sqrt{\frac{2}{3}}, 0 \\ -\frac{1}{\sqrt{6}}, \frac{1}{\sqrt{2}} \\ -\frac{1}{\sqrt{6}}, -\frac{1}{\sqrt{2}} \end{bmatrix} \begin{bmatrix} \cos\theta, -\sin\theta \\ \sin\theta, \cos\theta \end{bmatrix} \begin{bmatrix} Vds^* \\ Vqs^* \end{bmatrix}$$

wherein Vu* to Vw* represents the primary voltage command values 98a to 98c; Vds* represents the excitation voltage component command value 93a; Vqs* represents the torque voltage component command value 97a. The coordinate convertor 98 calculates this formula.

Figure 17:
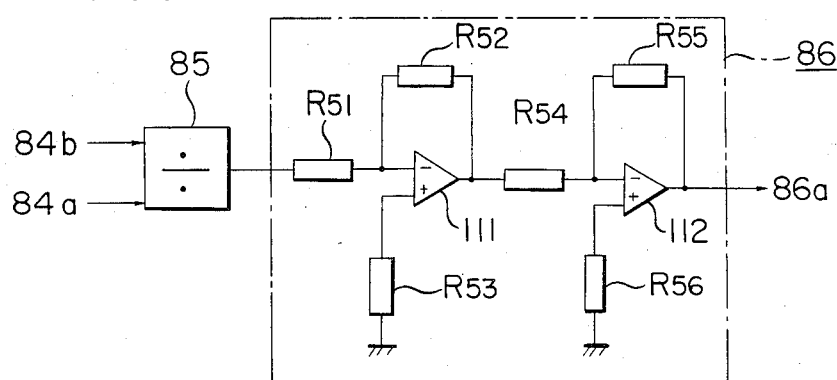
FIG. 17 is a circuit diagram showing a coefficient multiplying circuit of FIG. 11.

FIG. 17 shows the arrangement of the coefficient multiplying circuit 86. In the drawing, reference numerals 111 and 112 represent operational amplifiers, R51 to R56 resistors wherein R54=R55.

The slide frequency signal pωs 86a is calculated as follows:

$$p\omega s = \frac{iqs}{ids}\left(-\frac{R52}{R51}\right)\left(-\frac{R55}{R54}\right) = \frac{iqs}{ids} \cdot \frac{R52}{R51}$$

$$= \frac{iqs}{ids} \cdot \frac{Rr}{Lr}$$

wherein p represents the number of pole pairs of the motor 5,

ωs the sliding frequency 86a

Rr the secondary resistance of the motor 1

Lr the secondary inductance value of the motor 1. That is, the input from the divider 85 is multiplied by Rr/Lr and reversed to provide a positive value and then the sliding frequency signal 86a is output.

Figure 18:
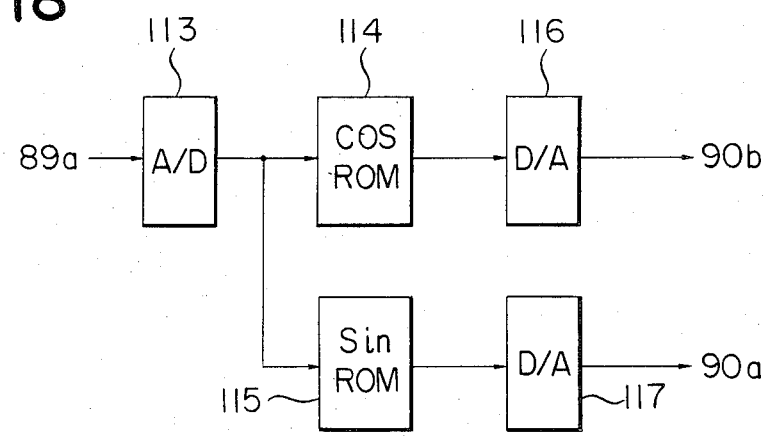
FIG. 18 is a block diagram showing a function generator of FIG. 11.

FIG. 18 shows the arrangement of the function generator 90. In the drawing, reference numeral 113 represents an A/D convertor (for example, ADC 80 manufactured by BURR BROWN Co., Ltd.) which receives the phase angle signal 89a and converts it into a digital value, numeral 114 a cosinusoidal ROM (for example i2716 manufactured by INTEL Co., Ltd.) which stores the value of cos Θ corresponding to each phase angle as a digital values, numeral 115 a sinusoidal ROM which stores the values of sin Θ, and numerals 116 and 117 D/A convertors (for example, DAC 80 manufactured by BURR BROWN Co., Ltd.) which convert digital values into analog values.

The values of the cos Θ corresponding to the phase angle represented by the phase angle signal 89a are read out from the consinusoidal ROM 114 and the values of sin Θ are read out from the sinusoidal ROM 115. These values are converted into analog values by the D/A convertors 116 and 117 to provide cosinusoidal and sinusoidal signals 90b and 90a.

Figure 19:
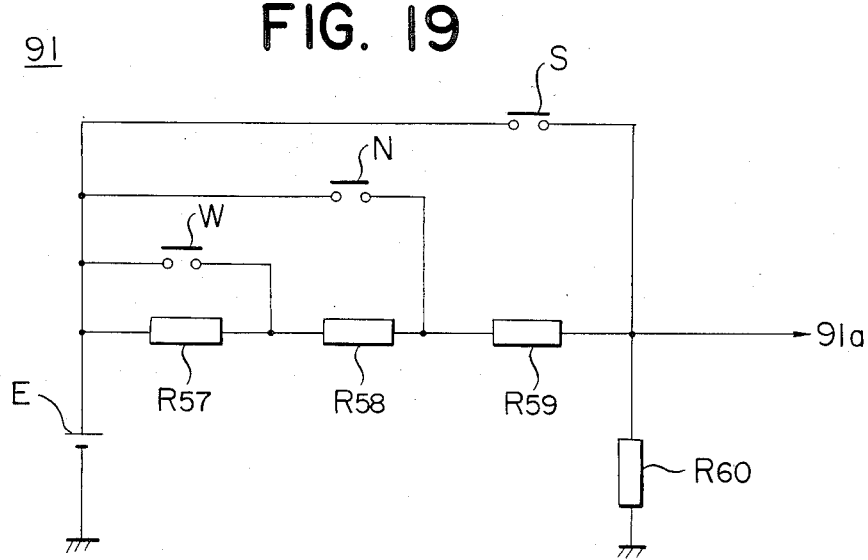
FIG. 19 is a circuit diagram showing an excitation command circuit of FIG. 11.

FIG. 19 shows the arrangement of the excitation command circuit 91. In the drawing, reference w represents a weak excitation relay contacts which are closed when a weak excitation is carried out, reference N represents excitation relay contacts which are closed when a reference excitation is carried out, reference s strong excitation relay contacts when a strong excitation is carried out, R57 to R60 resistors, and E a DC power source.

The excitation current component command value 91a which is determined by the resistors R57 to R60 is outputted by the closing of either one of the contacts w, N and s. When the contacts w are closed, this value becomes:

$$Ex \frac{R60}{R58 + R59 + R60}$$

When the contacts N are closed. This value becomes:

$$Ex \frac{R60}{R59 + R60}$$

When the contacts S are closed, this value becomes E.

FIGS. 20 to 29 shows arrangements of other elements. In the drawings, references A, A1, A2 . . . represent inputs, B an output, P, P1, P2 . . . represent operational amplifiers, R1, R2 . . . , r1, r2 . . . represent resistors, c a capacitor, D a diode, and Z a Zener diode.

Figure 20:
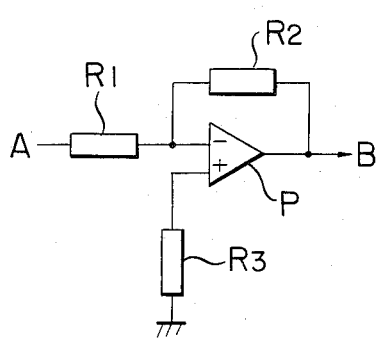
FIG. 20 shows an inverting amplifier.

FIG. 20 shows an inverting level amplifier. Since B=−(R2/R1)A, when R1=R2, we have B=−A.

Figure 21:
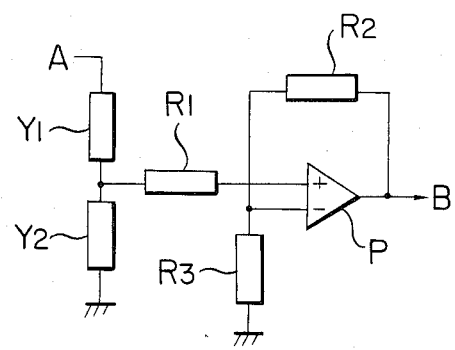
FIG. 21 shows a non-inverting amplifier.

FIG. 21 shows non-inverting amplifier. Since $$B = \frac{R2 + R3}{R3} \cdot \frac{r2}{r1 + r2} A.$$

asumming $$\frac{R2 + R3}{R3} \cdot \frac{r2}{r1 + r2}$$

to be $\sqrt{\frac{2}{3}} = 0.82$, we have $B = \sqrt{\frac{2}{3}}A$.

Figure 22:
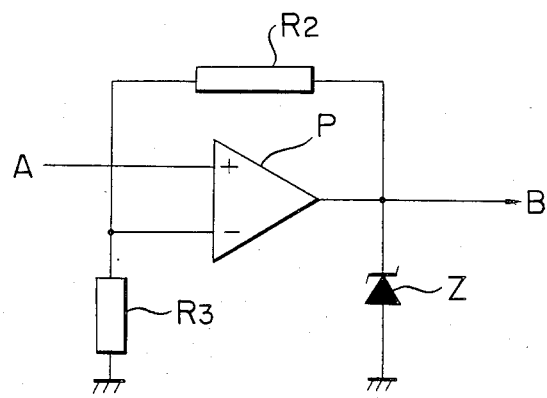
FIG. 22 shows a non-inverting amplifier with a limiter.

FIG. 22 shows an amplifier with a limiter. We have $$B = \frac{R2 + R3}{R3} A$$

wherein output A is saturated at a Zener voltage.

Figure 23:
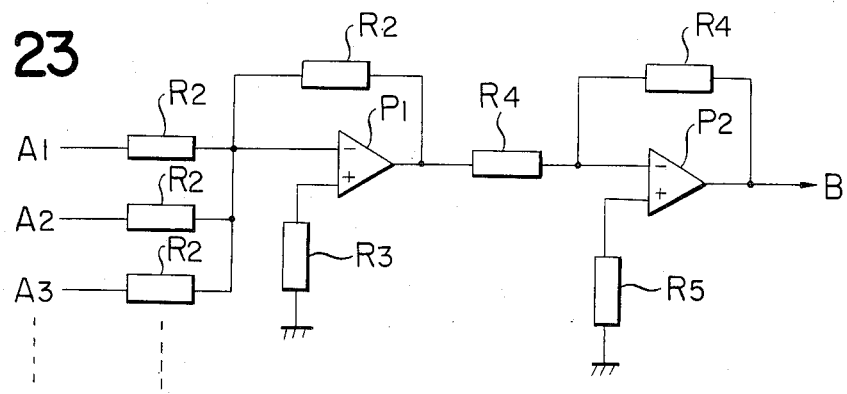
FIG. 23 shows an adders.

FIG. 23 shows an adder. $B = A1 + A2 + A3$

Figure 24:
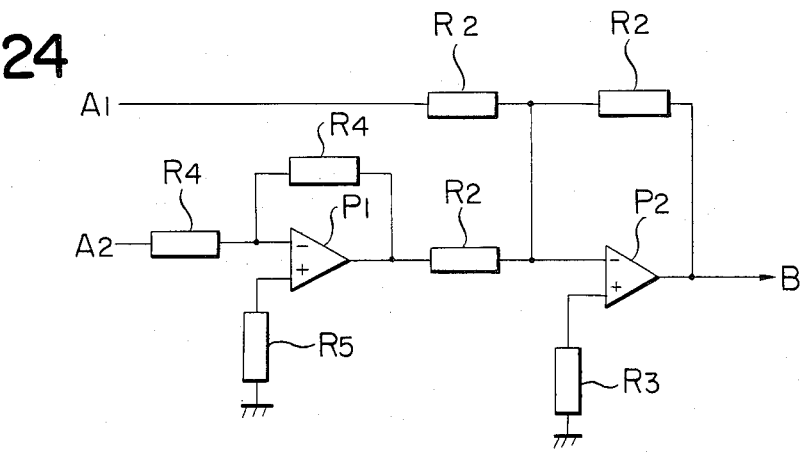
FIG. 24 shows a subtractor.

FIG. 24 shows a subtractor. $B = A2 - A1$

Figure 25:
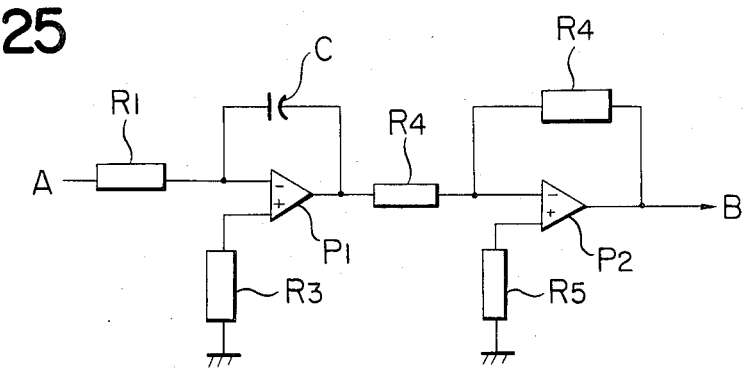
FIG. 25 shows an integrator.

FIG. 25 shows an integrator. Since $$B = \frac{1}{R1cs} A$$

where (S is a Laplacian operator), $B = 1/S$ when $R1c = 1$.

Figure 26:
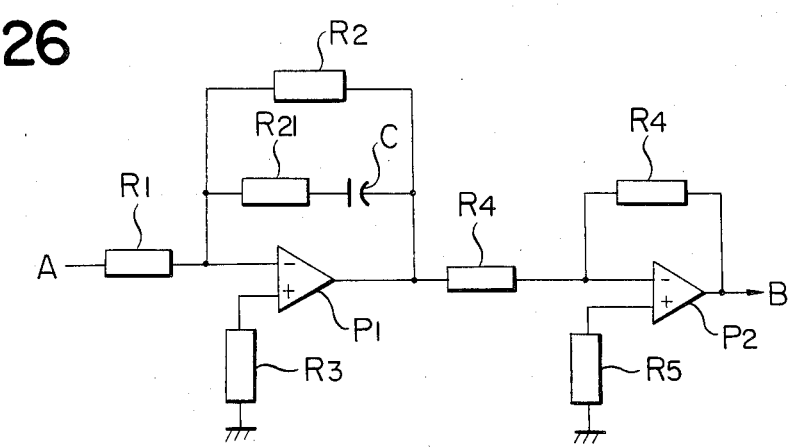
FIG. 26 shows a delay and advancement circuit.

FIG. 26 shows a delay and advancement circuit. Since $$B = \frac{R2}{R1} \cdot \frac{1 + R2CS}{1 + (R2 + R21)CS} A, \quad B = \frac{1 + T1S}{1 + T2S} A$$

if we let R1=R2, R2C=T1, (R2+R21) C=T2.

Figure 27:
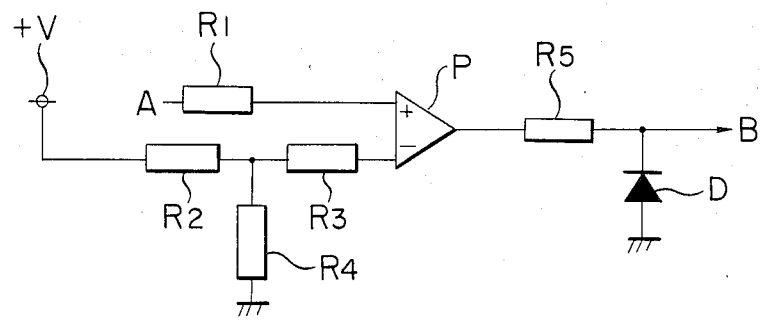
FIGS. 27 to 29 show comparators.
Figure 28:
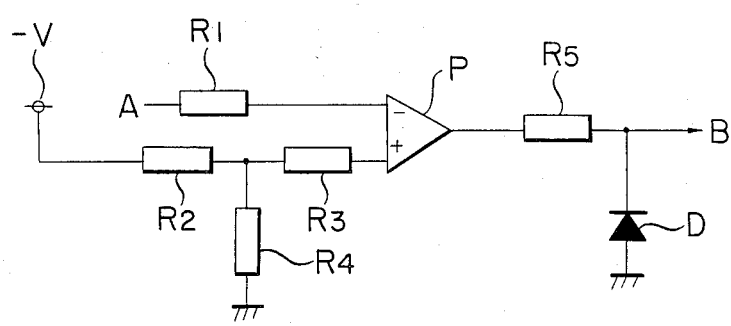

FIGS. 27 and 28 show comparators. The operational amplifiers P are applied with a bias voltage determined by resistors R2 and R4 respectively.

If this value is assumed to be e, the respective outputs B are "H" when $A \geq e$ in FIG. 27 and when $A \leq -e$ in FIG. 28.

Figure 29:
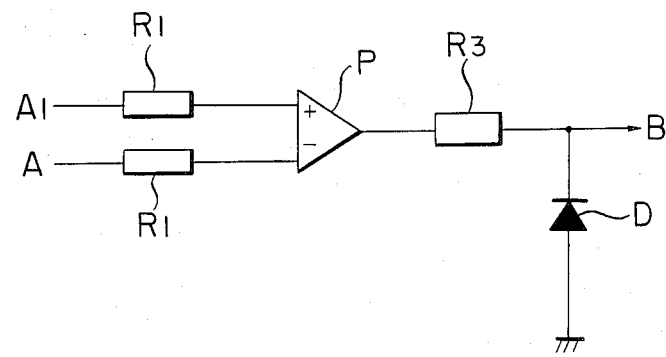
Figure 30:
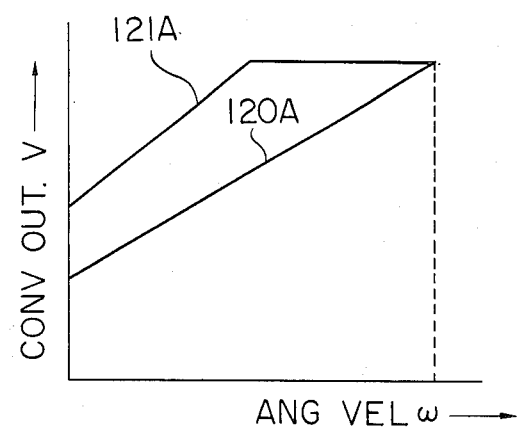
FIGS. 30 and 31 are views explaining the operation during a normal time and an energy saving running modes of operations, respectively.
Figure 31:
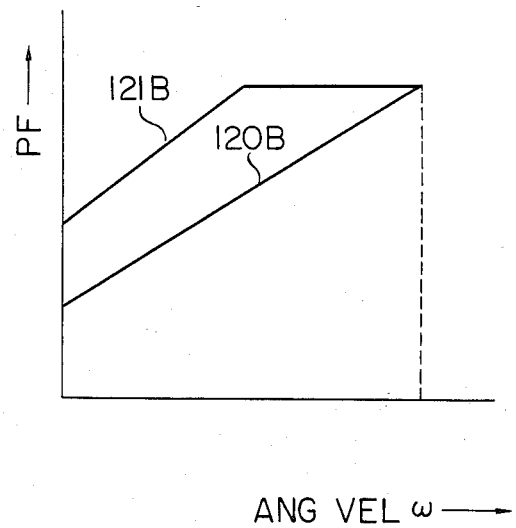

FIG. 29 shows a comparator, of which output B is "H" when $A1 \geq A2$ and is "L" when $A1 < A2$.

The outline of the operation of the vector control of the embodiment will be described.

If d and q axis components ids, iqs of the primary current and d and q axis components of the secondary current are assumed to be state variables and the d and q axis components Vds, Vqs of the primary voltage are assumed to be input variables in a d-q (excitation component-torque component) coordinate system which is rotating at an angular velocity of ω, the state of the induction motor is represented by the equation (1).

$$P\begin{bmatrix} ids \\ iqs \\ idr \\ iqr \end{bmatrix} = \begin{bmatrix} -\frac{Rs}{\sigma Ls} & \omega + p\omega r \frac{M^2}{\sigma LsLr} & \frac{RsM}{\sigma LsLr} & -p\omega r \frac{M}{\sigma Lr} \\ -\omega - P\omega r \frac{M^2}{\sigma LsLr} & -\frac{Rs}{\sigma Ls} & p\omega r \frac{M}{\sigma Lr} & \frac{RsM}{\sigma LsLr} \\ \frac{RrM}{\sigma LsLr} & p\omega r \frac{M}{\sigma Ls} & -\frac{Rr}{\sigma Lr} & \omega - \frac{p\omega r}{\sigma} \\ -p\omega r \frac{M}{\sigma Ls} & \frac{RrM}{\sigma LsLr} & -\omega + \frac{p\omega r}{\sigma} & -\frac{Rr}{\sigma Lr} \end{bmatrix} \begin{bmatrix} ids \\ iqs \\ idr \\ iqr \end{bmatrix} + \begin{bmatrix} \frac{1}{\sigma Ls} & 0 \\ 0 & \frac{1}{\sigma Ls} \\ -\frac{M}{\sigma LsLr} & 0 \\ 0 & -\frac{M}{\sigma LsLr} \end{bmatrix} \begin{bmatrix} Vds \\ Vqs \end{bmatrix} \quad (1)$$

wherein Rs represent a primary resistance of the induction motor, Rf a secondary resistance of the same, Ls a primary inductance of the same, Lr a secondary inductance of the same, M a mutual inductance between the primary and secondary windings, p the number of pole pairs, ωr an actual angular velocity of the rotor of the motor, P=d/dt a differential operator, σ a leak coefficient is represented by the formula (2).

$$\sigma = 1 - \frac{M^2}{LsLr} \quad (2)$$

Similarly, the generated torque Te of the induction motor is represented by the following formula (3)

$$Te = PM(iqsids - idsiqr) = P(M/Lr)(iqs\lambda dr - ids\lambda pr) \quad (3)$$

wherein λdr and λqr represent the d and q axis components of the secondary magnetic flux respectively and are represented by the following formula (4).

$$\left.\begin{array}{l} \lambda dr = Lridr + Mids \\ \lambda qr = Lriqr + Miqs \end{array}\right\} \quad (4)$$

As apparent from the formulae (1) and (3), the formula (1) is non-linear in that the state matrix includes the angular velocity ω of the secondary current vector and the angular velocity ωr of the rotor. The formula (3) is non-linear in that it includes a product of two state variables. Therefore it is difficult to carry out a preferable velocity control as it is.

The principle of the vector control is that the primary current to be supplied to the induction motor is deemed as a vector amount on a coordinate axes (d-q axes) rotating in synchronization with the secondary magnetic flux vector, and the primary current vector is resolved into a component parallel to the secondary magnetic flux (that is, excitation current component) and a component normal to the above-mentioned component (that is, torque current component) and non-interference control of the secondary magnetic flux and torque of the induction motor by independently controlling two components. When the excitation is controlled to a constant value, that is ids=Ids (constant value), the above-mentioned purpose is accomplished by carrying out the control so that the d axis component ids of the secondary vector is zero. That is, the state equation (1) and the generated torque formula (3) are linearized under conditions of $$ids = Ids \text{ (constant)} \quad (5)$$

$$idr = 0 \quad (6)$$

as follows:

$$P\begin{bmatrix} iqs \\ iqr \end{bmatrix} = \begin{bmatrix} -\frac{Rs}{\sigma Ls} & \frac{RrM}{\sigma LsLr} \\ \frac{RsM}{\sigma LsLr} & -\frac{Rr}{\sigma Lr} \end{bmatrix} \begin{bmatrix} iqs \\ iqr \end{bmatrix} + \begin{bmatrix} -Ids & -Ids\frac{PM^2}{\sigma LsLr} & \frac{1}{\sigma Ls} \\ 0 & Ids\frac{pM}{\sigma Lr} & -\frac{M}{\sigma LsLr} \end{bmatrix} \begin{bmatrix} \omega \\ \omega r \\ Vqs \end{bmatrix} \quad (7)$$

$$Te = -pMIds\, iqr = p\frac{M^2}{Lr} Ids\, iqs \quad (8)$$

At this time, λdr=MIds, λqr=0 The secondary magnetic flux becomes a vector rotating in synchronization with the d axis.

The conditions of the formulae (5) and (6) are met by controlling the angular velocity ω of the secondary magnetic flux vector and the primary voltage d axis component Vds by assuming the primary currents ids, iqs and the rotor's angular velocity ωr of the induction motor. This is mentioned by H. Sugimoto et al. in an article "Theory and Characteristics of a New Induction Motor Drive System Having Linear Transfer Function" p.465. Proce. of International Power Electronics Conference 1983, The Institute of Electrical Engineers Japan.

$$\omega = p\omega r + \frac{Rr}{Lr}\frac{iqs}{ids} = p\omega r + p\omega s \quad (9)$$

$$Vds = RsIds^* - \omega aLsiqs + K(Ids^* - ids) \quad (10)$$

wherein pωs in the formula (9) represents a slip frequency, Ids in the formula (10) represents an excitation current command value (constant value).

FIG. 11 is a circuit diagram showing an embodiment of the above-mentioned vector control system in which the excitation is constantly controlled by using the pωM inverter 29. The first and second terms of the right member of the formula (10) are omitted on the basis that the gain k of the third term is sufficiently high.

The excitation current component command value (91a) Ids* which is outputted from the excitation command circuit 91 is inputted to the subtractor 92 in which it is compared with the excitation current component signal ids designated by 84a which is generated from the three-phase to two-phase convertor 84, that is the excitation component of the current which actually flows to the motor 1. The subtractor 92 outputs the error. This error becomes the excitation voltage component command value Vds* represented by 93a via the excitation current component control circuit 93 which is inputted to the two-phase to three-phase coordinate convertor 98.

The speed command value ωr* represented by 14a which is outputted from the speed command generating circuit 10 is inputed to the subtractor 94 in which it is compared with the speed signal ωr represented by 5a from the speed detector 5. The subtractor outputs the error. This error becomes the torque current component command value iqs represented by 95a which is then inputed to the subtractor 96 in which it is compared with the torque current component signal iqs represented by 84a generated from the two-phase to three-phase convertor 84 and the subtractor 96 outputs this error. The error becomes θ the torque voltage component command value Vqs* represented by 97a which is then input to the two-phase to three-phase coordinate convertor 98.

On the other hand, the subtractor 85 and the coefficient multiplying circuit 86 output the slide frequency signal pωs represented by 86a in accordance with the second term of the formula (9). In the adder 88 this signal is added with the slide frequency pωr which is obtained by multiplying the speed signal 5a with the number of pole pairs p to provide a synchronization angular speed signal ω of the secondary magnetic flux vector represented by 88a.

This signal is integrated by the integrator 89 to provide a phase angle signal of the secondary magnetic flux vector θ represented by 89a. In a function generator the sinusoidal wave signal 90a and the cosinusoidal wave signal 90b with respect to the phase angle θ are calculated and then fed to the coordinate convertors 84 and 98.

The two-phase to three-phase convertor 98 converts the inputs 93a, 97a, 90a, 90b to provide the primary voltage command values 98a to 98c to operate the base drive circuit 98 of the PWM inverter 29. Well known PWM control is carried out by applying the base drive signals 28a to 28f to the inverter 20. On the other hand, the synchronization angular velocity signal 88a is added with a constant value signal 22 in the adder 21. Then, the added signal is inputted to the phase control circuit 25 via the contacts 24b. The phase control circuit 25 determines whether the motor 1 is operated at power running mode or regenerative braking mode by detecting the voltage detector output 19a and the syncronization angular velocity signal 24X. At power running mode, the gate circuit 27 is operated to apply the ignition signals 27a to 27f to the power running convertor 17. At the regenrative braking mode, the gate circuit 26 is operated to apply the ignition signals 26a to 26f to the regenerative braking convertor 16. As a result of this, the voltage across the smoothing capacitor is changed to carry out the well known PAM (pulse amplitude modulation) control.

In such a manner independent negative feed back control systems are provided for the excitation current component signal ids represented by 84a of the primary current which is DC and the torque current component signal iqs represented by 84b. When a given excitation current component command value Ids* and the torque current component command value iqs* represented by 95a corresponding to the error between the speed command value ωr* represented by 10a and the speed signal ωr represented by 5a are provided, proportional control or proportional and integral control is carried out for the respective current errors in individual current control systems. Control to make the primary current vector of the motor 1 equal to the primary current reference vector is carried out by using generated primary voltage command value 98a to 98c as manipulated variable. These make it possible to carry out a high precision speed control which is excellent in response. The slide frequency signal pωs represented by 86a is calculated by using the primary feed back current of the motor 1. The spontaneous value of the primary voltage of the motor 1 is provided in accordance with the calculated signal. This also makes it possible to carry out a high precision vector control which meets requirements of the equivalent direct current device during transient time.

The PWM inverter 29 generates AC outputs 29a to 29c of the variable voltage and frequency. The motor 1 is driven to run the cage 8, the speed of which is automatically controlled at a high precision.

As mentioned above, by the operation of the phase control circuit 25, the output voltage of the power running convertor 17 or the regenerative braking convertor 16 is changed in accordance with the angular velocity ωr of the motor 1 as shown by the curve 120A in FIG. 20 to prevent the noise generation at a low speed. When the output voltage is changed, the power factor as viewed from the AC power R-S-T is changed as represented by a curve 120B of FIG. 31.

On the other hand, when the energy saving command is outputted, the energy saving running command relay contacts 24a are closed and the contacts 24b and 24c are opened. When the contacts 24c are closed, the acceleration and deceleration command relays N3 and N4 are not energized as mentioned above and the speed command signal 10a becomes the low speed command value represented by the curve 10a4 of FIG. 14. In accordance with this low speed command value, the voltage and frequency control is carried out in the circuit of FIG. 2 so that the output frequency of the PWM inverter 29 is decreased and the rotational speed of the motor 1 and the running speed of the cage 8 is decreased. Since the motor 1 is controlled almost without changing the slip at this time, the efficiency will not fall. When the cage 8 makes a descent under a high load the motor rotates at a rotational speed higher than a synchronization speed which is determined by the above-mentioned frequency. Energy consumption is decreased due to regenerative braking.

On the other hand, the output of the adder 21 is applied to the phase control circuit via the contacts 24a when the gain of the amplifier 23 with a limiter 23 becomes high by closing of the contacts 24a. The synchronization angular velocity signal 24x becomes higher than that during usual operation as a result of this, and the output voltage of the power running convertor 17 or the regenerative braking convertor 16 changes as represented by a curve 121A of FIG. 30. The power factor changes as represented by a curve 121B of FIG. 31. That is, the power factor at a low speed becomes higher than that during normal operation. As a result of the improved power factor, the input current to the power running convertor 17 or the regenerative braking convertor 16 is decreased so that the conversion loss at the convertor, the power which is consumed at power lines, filter power source (not shown) becomes low. Accordingly, the effect of savings in energy is furthermore enhanced.

The system of the present invention is applicable when the motor 1 is operated by an emergency generator on interruption of the AC power supply R-S-T. In this case the contacts 24a to 24c are used as relay contacts which are operated at emergency operation and the AC power source R-S-T is used as the emergency generator. If the energy saving running command is adapted to be generated when the emergency running is commanded, the energy consumption at emergency operation would not only be lowered, but also it would be possible to decrease the capacity of the emergency generator due to decrease in the primary current.

As described above in accordance with the present invention, the alternative current having a variable voltage and frequency which are converted by the inverter is supplied to an induction motor for driving the elevator so that the speed command value when energy saving operation is commanded is lowered and the output frequency of the inverter is lowered. Accordingly, the efficiency would not be lowered even if the speed of the cage is lowered so that the energy saving operation may be accomplished. Since the output voltage of the convertor is increased at this time, the power factor is improved and the energy is furthermore saved.

What is claimed is:

1. A system for controlling the speed of an alternating current elevator in which a direct current power from a direct current power source is converted into an alternating current power having a variable voltage and frequency by means of an inverter and the alternating power is supplied to an induction motor so that a cage is operated by controlling the motor in response to a speed command value, said system comprising an energy saving operation command unit which commands the energy saving operation;
    a low speed command generating circuit which generates a low speed command value lower than said speed command value; and
    a frequency decreasing circuit which decreases the output frequency of the inverter in response to said low speed command value.

2. The system for controlling the speed of the elevator as claimed in claim 1 in which said low speed command generating circuit outputs a speed command value which gradually changes in acceleration or deceleration, the upper limit of the output being preset lower than the upper limit of the speed command value at normal operation.

3. The system for controlling the speed of the alternating current elevator as claimed in claim 1 and further including a speed command generating circuit which is adapted to output the speed command value which gradually increases or decreases on acceleration or deceleration of the elevator;
    said speed command generating circuit functioning as said low speed command generating circuit by decreasing the speed command value when said energy saving operation command unit operates.

4. The system for controlling the speed of the alternating current elevator as claimed in claim 3 in which said speed command generating circuit clips the speed command output at a given value so that the upper limit of the speed command value is decreased when said energy saving operation command unit operates.

5. The system for controlling the speed of the alternating current elevator as claimed in claim 3 in which said speed command generating circuit includes resistors for gradually changing the speed command value, the change in the resistance of said resistors is clipped at a given value and is outputted as the low speed command value when said energy saving operation command unit operates.

6. The system for controlling the speed of the alternating current elevator as claimed in claim 5 in which said speed command generating circuit includes a direct current power source, a resistor circuit which is connected to said power source, and a plurality of contacts for gradually changing the resistance of said resistor circuit by partially short circuiting the resistor circuit, whereby predetermined contacts of said contacts are not operated so that the upper limit of the speed command value is clipped when said energy saving operation command unit operates.

7. The system for controlling the speed of the alternating current elevator as claimed in claim 6 in which said energy saving operation command unit includes contacts which close or open when the energy saved operation is commanded, whereby predetermined contacts of said resistor short circuiting contacts are rendered inoperative in response to the operation of the contacts of said unit.

8. The system for controlling the speed of the alternating current elevator as claimed in claim 7 in which said resistor short circuiting contacts are the contacts of relays having solenoids, said energy saving command contacts being connected with an excitation circuit for the predetermined solenoids of said relays, the operation of the solenoids being rendered inoperative when energy saving operation is commanded.

9. The system for controlling the speed of the alternating current elevator as claimed in claim 1 and further including a drive circuit which provides a driving signal to said inverter, said driving circuit receiving the lower speed command value from said low speed command generating circuit for decreasing the output frequency of said inverter and functioning as said frequency lowering circuit when said energy saving operation command unit operates.

10. The system for controlling the speed of the alternating current elevator as claimed in claim 9 in which said inverter generates an alternating current output having a variable voltage and frequency in response to the driving signal from said drive circuit for driving said motor by the alternating current and generates an alternating current output having a lowered frequency to drive the motor almost without changing the slip when the energy saving operation command unit operates.

11. A system for controlling the speed of an alternating current elevator in which an alternating current power from a commercial alternating current power line is converted into a direct current power having a variable voltage by means of a convertor and the direct current power is converted into an alternating current power having a variable voltage and frequency by an inverter and the alternating current power is supplied to an induction motor and the motor is controlled in response to the speed command value to operate a cage, said system comprising;
    an energy saving operation command unit which commands are energy saving operation;
    a low speed command generating circuit which generates a low speed command value lower than said speed command value when said energy saving operation command unit is operated;

a voltage control circuit which increases the output voltage of said convertor above that before the operation of said command unit is operated;

and a frequency decreasing circuit which decreases the output frequency of said inverter in response to said low speed command value.

12. The system for controlling the speed of the alternating current elevator as claimed in claim 11 and furthermore including a convertor control circuit which generates a driving signal to said convertor, an output of said voltage control circuit being supplied to said convertor control circuit.

13. The system for controlling the speed of the alternating current elevator as claimed in claim 11 in which said voltage control circuit includes a first circuit which provides said convertor control circuit with an output at normal operation and a second circuit which provides said convertor control circuit with a high voltage output at energy saving operation.

14. The system for controlling the speed of an alternating current elevator as claimed in claim 13 in which said voltage control circuit further includes switching means for selectively connecting said convertor control circuit with said first and second circuits so that the output to said convertor is supplied from said first or second circuit by said switching means.

15. The system for controlling the speed of an alternating current elevator as claimed in claim 14 in which said switching means is provided by switching contacts between said first and second circuits, said switching contacts connecting said convertor driving circuit with said first and second circuit at normal and energy saving operations respectively.

16. The system for controlling the speed of the alternating current elevator as claimed in claim 16 in which said first and second circuits are provided with a command input line, said first circuit being adapted to directly output the input from the common input line, said second circuit being adapted to amplify the input from said common input line and outputs the amplified input.

17. The system for controlling the speed of the alternating cirrent elevator as claimed in claim 16 in which said amplifier includes an amplifier with a limiter which amplifies an input thereto and saturates the same at a given value.

18. The system for controlling the speed of the alternating current elevator as claimed in claim 17 in which a predetermined constant signal and a signal generated by a synchronization angular velocity signal are inputted to said common input line.

19. The system for controlling the speed of the alternating current elevator as claimed in claim 13 in which said first circuit is connected in parallel with the second circuit, said first and second circuits being connected with contacts respectively, said contacts being adapted to alternatively close and open, whereby to carry out the selective connection of both circuits to said convertor control circuit.

* * * * *